(12) United States Patent
Mach et al.

(10) Patent No.: US 10,334,861 B2
(45) Date of Patent: Jul. 2, 2019

(54) APPARATUS FOR FILLING TUBULAR CASES AND RELATED METHOD

(71) Applicant: VEMAG Maschinenbau GmbH, Verden/Aller (DE)

(72) Inventors: Matthias Mach, Hannover (DE); Jan-Nils Hagedorn, Verden (DE); Heiner Matthies, Kalbe (DE); Olaf Grote, Eystrup (DE); Alexander Lewin, Verden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 16/114,765

(22) Filed: Aug. 28, 2018

(65) Prior Publication Data

US 2019/0059400 A1    Feb. 28, 2019

(30) Foreign Application Priority Data

Aug. 31, 2017    (DE) .......................... 10 2017 120 104

(51) Int. Cl.
*A22C 11/00*    (2006.01)
*A22C 11/02*    (2006.01)
*A22C 11/10*    (2006.01)

(52) U.S. Cl.
CPC ...... *A22C 11/0227* (2013.01); *A22C 11/0218* (2013.01); *A22C 11/10* (2013.01)

(58) Field of Classification Search
CPC ....... A22C 11/00; A22C 11/008; A22C 11/02; A22C 11/0209; A22C 11/0227; A22C 11/0245; A22C 11/0254

(Continued)

(56) References Cited

U.S. PATENT DOCUMENTS

| 4,577,370 A | * | 3/1986 | Kollross | ................ A22C 11/02 452/22 |
| 4,625,362 A | | 12/1986 | Kollross et al. | |

(Continued)

FOREIGN PATENT DOCUMENTS

| DE | 3019981 A1 | 12/1981 |
| DE | 69818290 T2 | 8/2004 |

(Continued)

OTHER PUBLICATIONS

German Patent Office, Office Action in DE 10 2017 120 104.1 dated Dec. 1, 2018 (5 pages).

(Continued)

*Primary Examiner* — Richard T Price, Jr.
(74) *Attorney, Agent, or Firm* — Wood Herron & Evans LLP

(57) ABSTRACT

A filling apparatus for and method of filling gathered tubular cases is provided. The filling apparatus includes a filling tube onto which a gathered tubular case can be pushed, and a moveable receiving portion which accommodates a first end of the filling tube and which is adapted to move the filling tube into a charging position in which the case can be put on to the filling tube and into a filling position in which the case can be filled. The filling apparatus also includes a pushing-on device which is moveable axially relative to the filling tube longitudinal axis for pushing the case on to the filling tube in the charging position, an axially moveable entrainment ring arranged on the filling tube, and a sensing device for ascertaining the position of the entrainment ring and/or the pushing-on device.

15 Claims, 7 Drawing Sheets

(58) Field of Classification Search
USPC .............. 452/30–32, 35–37, 46–48, 51
See application file for complete search history.

(56) References Cited

U.S. PATENT DOCUMENTS

| | | | | |
|---|---|---|---|---|
| 5,297,983 | A | * | 3/1994 | Mueller ............. A22C 11/0236 452/25 |
| 6,139,416 | A | * | 10/2000 | Topfer ................... A22C 11/02 452/31 |
| 7,666,071 | B2 | | 2/2010 | Nakamura et al. |
| 8,827,774 | B2 | * | 9/2014 | Bilowski .............. A22C 11/008 452/35 |

FOREIGN PATENT DOCUMENTS

| | | |
|---|---|---|
| DE | 60312360 T2 | 11/2007 |
| DE | 102008026095 B4 | 11/2017 |
| EP | 0096378 A1 | 12/1983 |
| EP | 0110343 A1 | 6/1984 |

OTHER PUBLICATIONS

European Patent Office, Search Report issued in EP 18191751.9-1011 dated Jan. 21, 2019 (9 pages).

* cited by examiner

APPARATUS FOR FILLING TUBULAR CASES AND RELATED METHOD

CROSS-REFERENCE TO RELATED APPLICATION

This application claims priority to German Application No. 10 2017 120 104.1, filed Aug. 31, 2017. The above-mentioned patent application is incorporated herein by reference in its entirety.

TECHNICAL FIELD

The invention relates to a filling apparatus for filling gathered tubular cases with a pasty material, in particular sausage meat. The invention further relates to a method of filling gathered tubular cases with a pasty material, in particular by using the filling apparatus.

BACKGROUND

Filling apparatuses for and methods of filling gathered tubular cases with pasty material, in particular with sausage meat, are known in the state of the art. Apparatuses are previously known for industrial sausage production, in which a tubular case to be filled is applied to a filling tube in an automated procedure in a gathered state (also referred to as a gathered sausage casing or shirred sausage skin). Sausage meat then issues at the open end of the filling tube and is delivered into the tubular case which has been applied to the filling tube. By portion-wise closure of the cases, for example by portion-wise twisting relative to each other or by other measures, the continuous case line is subdivided into individual sausages after having been filled with sausage meat.

To accelerate the production process the state of the art discloses filling apparatuses in which a plurality of and in particular two filling tubes are arranged on a main body which is rotatable parallel to the longitudinal axis of the filling tube and which has a receiving portion, the receiving portion being rotatable in a rotary turret-like fashion together with the filling tubes. By such an arrangement, the filling tube is equipped with a gathered tubular case and the case is properly filled in different operating positions. The step of applying the gathered tubular case to the filling tube in a so-called equipping position is further automated in apparatuses which are previously known from the state of the art. Thus, it is previously known for the gathered tubular cases to be removed from a magazine by sliders and then positioned by the grippers in front of the filling tube in such a way that such a case can be pushed on to the filling tube, by a pushing-on member in an automated procedure.

After the sausage skin casing has been pushed on to the filling tube the latter is rotated into a filling position. Filling of the gathered tubular cases is conducted in that filling position. For portion-wise filling of the tubular cases and for affording individual sausages a so-called casing braking system is also employed in the state of the art. The sausage portions are formed by dividing elements engaging into the rotating sausage string. The primary function of the casing brake is to hold the casing on the filling tube so that the casing can be firmly filled so as to be plump.

The previously known apparatuses make it possible to produce sausages at high speed in a fully automated procedure. It will be noted however that there is the disadvantage in the described state of the art that the dimensions, in particular the lengths of the gathered tubular cases (skin casings) are to be manually input by the machine operator. That not only involves a possible source of error but also increased manual involvement when using gathered tubular cases of differing lengths. In addition, the apparatuses previously known from the state of the art are only limitedly capable of monitoring the filling process. For example, it occasionally happens that, when the tubular cases are being pushed on to the filling tube, the cases are inadequately positioned, they buckle while being pushed on, or they are defective in themselves, in which respect the specified fault states are not detected in the case of previously known apparatuses. If such faults situations occur the result is frequently a production stoppage. If fault conditions are not detected immediately there is also the risk that defective sausages and thus under some circumstances reject wastage is produced.

With that background, it would be desirable to develop an apparatus and a method such that the disadvantages encountered in the state of the art are eliminated to the greatest possible degree. In particular, it would be desirable to provide an apparatus and a method which are less susceptible to faults, which permit a greater average production quantity, which involve a high level of production process reliability and which relieve the stress on the installation operator.

SUMMARY

According to one embodiment of the invention, these technical objectives are attained by providing the filling apparatus with a sensing device for ascertaining the position of the entrainment ring and/or the pushing-on device. Furthermore, according to one embodiment of a method under this invention, these technical objectives are attained by the steps: providing a gathered tubular case, pushing the case on to a filling tube by a pushing-on device, and ascertaining the position of the pushing-on device and/or an entrainment ring arranged on the filling tube.

Such a sensing device permits sensing of the parameters in respect of the position of the entrainment ring and/or the position of the pushing-on device, that are particularly relevant to the filling process. It is particularly advantageous that a large amount of information in respect of the process quality and in respect of control of the method and the apparatus can be obtained from the knowledge of at least one of the specified parameters. For example, by knowledge of those parameters, it is possible to determine the dimension of the gathered tubular cases, to detect possible faults in the pushing-on movements and to optimize subsequent method steps in dependence on those parameters so that the output of such an apparatus can be increased in comparison with the apparatuses previously known. The filling process is less susceptible to error.

In one aspect, the sensing device has at least one travel pick-up sensor and/or linear sensor for ascertaining the position of the entrainment ring and/or the pushing-on device. By way of example, in particular with reference to the pushing-on device, those sensors can be arranged remote from the gathered tubular case, protected for example by a housing. There is therefore no need for the sensors to come into direct contact with the tubular cases. Overall, maintenance of the apparatus is thus made easier and contamination of the sensors is also fully effectively avoided. Such sensors are also known for their durability and measurement accuracy.

In another aspect, the at least one travel pick-up sensor and/or linear sensor is in the form of an inductive sensor.

Additionally or alternatively, the at least one travel pick-up sensor and/or linear sensor in a second embodiment is in the form of an optical sensor. In dependence for example on the structural space available, the required measurement accuracy and the like, it is possible for different types of sensors per se to be used alone or in suitable combination. For example, it is also possible to envisage combining sensors of differing types in order to make use of strengths of different types of sensors, to compensate for measurement deviations and to reduce failure probabilities.

In some embodiments, the sensing device has at least one, a plurality of or all of the following sensors: ultrasound sensors, capacitive sensors and magnetostrictive travel sensors.

In a further aspect, if the operation of determining the position of the entrainment ring is conducted by a fixed linear sensor and/or a plurality of fixed inductive sensors in series and/or a fixed inductive sensor.

In one aspect, the position of the pushing-on device is ascertained by feedback from its drive element. It is possible to achieve cost advantages in that case, while at the same time a high level of measurement accuracy and measurement reliability is attained.

In further embodiments, the sensing device has a control device adapted to determine the case length. Such a control device serves for transformation of the sensor data (data relating to position and translation speeds for example) into information which can be used in many different ways for the production process. For example, the length of the gathered cases can be directly ascertained by interrelating the position of the entrainment ring and the pulling-on device. Those lengths are thus fully automatically detected and no longer have to be manually input by the operator. Length tolerances in respect of the cases to be filled are also detected and the use of cases of differing lengths is possible in a fully automated production process for producing sausages.

In a further aspect, the case has a plug, wherein the control device is adapted to determine the plug length. The use of plugs which are typically arranged at one of the ends of the tubular cases affords advantages in regard to the production of different types of sausages. If such cases are used in previously known filling apparatuses, the plug length is a further parameter which is to be manually input by the operator. With the apparatus according to the invention the width of the plug, after the case has been pushed on to the filling tube, can be ascertained, in particular based on the position of the pushing-on device after the case has been pushed on. That again liberates the operator from input requirements, it eliminates a source of error and it detects length tolerances in respect of the plug lengths at an early time. In addition, knowledge of the precise plug length makes it possible to optimize subsequent method steps in such a way that individual apparatus actuators can be exactly pre-positioned, whereby the production process overall can be further optimized and speeded up.

In some embodiments, the apparatus also includes a casing slider which is adapted to move the entrainment ring in the filling position axially relative to the filling tube longitudinal axis, and a casing braking system, wherein the axial spacing between the casing braking system and the filling tube longitudinal axis is variable, and wherein the control device is adapted to control the position of the casing braking system and the position of the casing slider axially relative to the filling tube longitudinal axis. As already stated above such a control device is capable of further processing the ascertained sensor data and using them for following process steps. Positioning of the entrainment ring and the casing braking system in dependence on the detected cases and plug dimensions significantly enhances the process and production speed. In the case of apparatuses which are known from the state of the art positioning of the entrainment ring and the casing braking system have to be ascertained in the context of so-called measurement runs in which the entrainment ring and the casing braking system are very slowly advanced until they directly reach the cases or the plugs and the resistance to the advance movement is increased. That is not only time-consuming in apparatuses known in the state of the art, but under unfavorable conditions it is disadvantageous in terms of the quality of the cases and their surface nature. The approach movement according to the invention of preliminary positions of the entrainment ring and the casing braking system in dependence on the sensed data which are further processed by the control device thus permits a markedly higher level of process quality and an overall higher production output. These various aspects and embodiments can be combined in any combination, so long as the filling apparatus achieves the technical advantages described above.

Referring now to another embodiment of the invention, the method of filling further has the step: determining the case length, in particular from the position of the entrainment ring and/or the pushing-on device. In regard to a detailed discussion of the advantages attention is to be directed to the foregoing description. In summary the step of determining the case length makes it possible to relieve the operator of the stressful task of input, the use of different case lengths in an automated production process is made possible and length tolerances in respect of the cases can be detected.

The method may further include the step: determining the length of a plug arranged at the case, in particular from the position of the pushing-on device after the case has been completely pushed on to the filling tube. Determining the plug length makes it possible in known manner to relieve the stress on the operator, to accelerate the production process and to provide for improved monitoring thereof.

In one aspect, the method further includes the following step: stopping the filling apparatus when exceeding of a definable maximum plug length is detected, or when the case cannot be pushed completely on to the filling tube, or when the case buckles while being pushed on. If the above-indicated faults occur when the case is being pushed on to the filling tube the production process is frequently severely disrupted with the filling methods previously known in the state of the art. Under some circumstances this results in the production of rejects, under some circumstances the apparatus has to be comprehensively cleaned, and it is necessary for an operator or an alternative supervisor to monitor the method implementation. The method step according to the invention therefore advantageously permits automated detection of faults when applying the case to the filling tube. The machine is stopped immediately whereby the production of rejects is prevented. More extensive damage to the apparatus is also prevented. The operator is also relieved of the need for continuous monitoring and in the case of the occurrence of one of the errors the operator is informed about the occurrence thereof.

In another aspect, the method includes the step: controlling the position of a casing braking system moveable axially relative to the filling tube longitudinal axis in such a way that the spacing of the casing braking system from an open end of the filling tube, that faces towards the casing braking system, is greater in the filling position than the detected plug length. When using plugs of differing length, the position of the casing braking system is to be adapted to the plug length. By measuring the plug during the preceding method steps it is now possible to implement positioning of the casing braking system in specifically targeted fashion in dependence on the plug length. Alternatively or additionally, monitoring is also possible to ascertain to what extent a detected plug length is greater than a maximum plug length which can be tolerated by the method and the apparatus. If for example plug lengths which are not compatible with the possible displacement travel of the casing braking system are used, the generation of a fault signal is possible. Overall specifically targeted positioning of the casing braking system means that, after rotation of a filling tube out of the charging position into the filling position, the casing braking system can be correctly oriented within the shortest possible time and production of the sausages can be begun without a relevant time delay.

In some embodiments, the method also includes the step: controlling the position of a skin pushing member which is moveable axially relative to the filling tube longitudinal axis in such a way that the position of the skin pushing member corresponds to the case length. In the case of apparatuses which are known from the state of the art a slow and time-consuming detection run is required in respect of the casing slider, after a filling tube equipped with a case has moved from the charging position into the production position. As the length of the case is previously known from the method according to the invention the casing slider can be moved immediately into a position which corresponds to the length of the case. A time-consuming detection run on the part of the casing slider is no longer required, whereby production and setup times are again significantly reduced. These various aspects and embodiments can be combined in any combination, so long as the filling method achieves the technical advantages described above.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
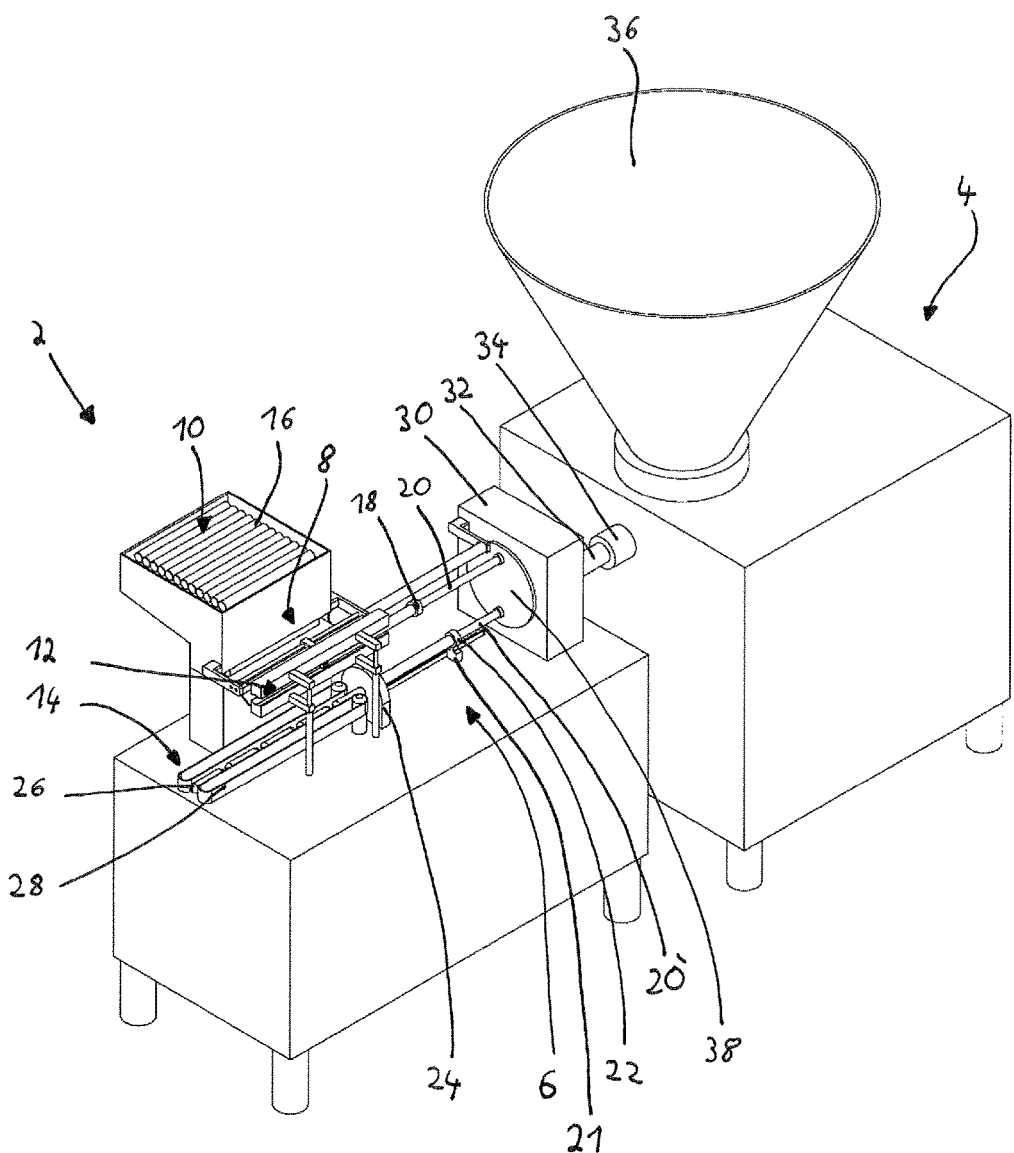
FIG. 1 shows a perspective view of a machine for filling tubular cases with a filling apparatus according to one embodiment of the invention.

FIG. 1 shows a filling machine 4 for filling tubular cases 16, in particular artificial or natural sausage casings, in conjunction with an attachment 2 at which a filling apparatus 6 and a case loading unit 8 are arranged. The machine 4 further has a filling hopper 36 and an extrusion head 34 which are coupled in material-conducting relationship to a twisting-off head 30 by way of a delivery tube 32. The case loading unit 8 includes a case magazine 10 for accommodating a plurality of tubular cases 16 and a case gripping device 12. In addition, arranged at the attachment 2 is a conveyor device 14 having two conveyor elements 28 and 28' extending at a spacing relative to each other in a horizontal plane (see FIG. 4). The conveyor device 14 serves to transport the sausages 26 produced by the filling apparatus 6.

The filling apparatus 6 serves to fill the tubular cases 16 by the pasty material conveyed by the extrusion head 34. The twisting-off head 30 has a receiving portion 38 which is rotatably mounted in a rotary turret-like fashion for receiving the first ends of two filling tubes 20, 20' which are respectively in turn arranged rotatably and drivable on the receiving portion 38. The rotatable receiving portion 38 has an axis of rotation extending in the horizontal plane. The axis of rotation of the receiving portion 38 which is in the form of a pivotal plate and the axes of rotation of the filling tubes 20, 20' extend parallel to each other. In addition, the axes of rotation of the filling tubes 20, 20' are arranged spaced uniformly from the axis of rotation of the receiving portion 38. That permits a simplified change of the filling tubes 20, 20' between the positions on the filling apparatus 6. A tubular case 16 is pushed on to the filling tube 20 in the upper position, the so-called charging position, while filling of a tubular case 16 which has been pushed on to the filling tube 20' is conducted preferably at the same time on the filling tube 20' in the lower position, the so-called filling position.

Associated with the filling tube 20 arranged in the upper charging position is the case loading unit 8 with its case gripping device 12. The case gripping device 12 includes two gripper jaws 42, 42' which are mounted moveably relative to each other (see FIG. 4), with which a tubular case 16 is taken over from the case magazine 10. The case 16 is at least held in the case gripping device 12.

Associated with the filling tube 20' arranged in the filling position is a casing braking system 24, also referred to as the case braking system, which in particular provides that the case 16 which has been pulled on to the filling tube 20' is straightened out of its gathered condition during filling thereof and is thus delivered from the filling tube 20' in controlled fashion. At the same time the braking system 24 ensures that the case 16 which has still remained on the filling tube 20' is rotated together with the filling tube 20' about its axis of rotation during the step of twisting off the case 16 and producing a twist-off location between two successive portions of a string of sausages 26 to be produced.

Figure 2:
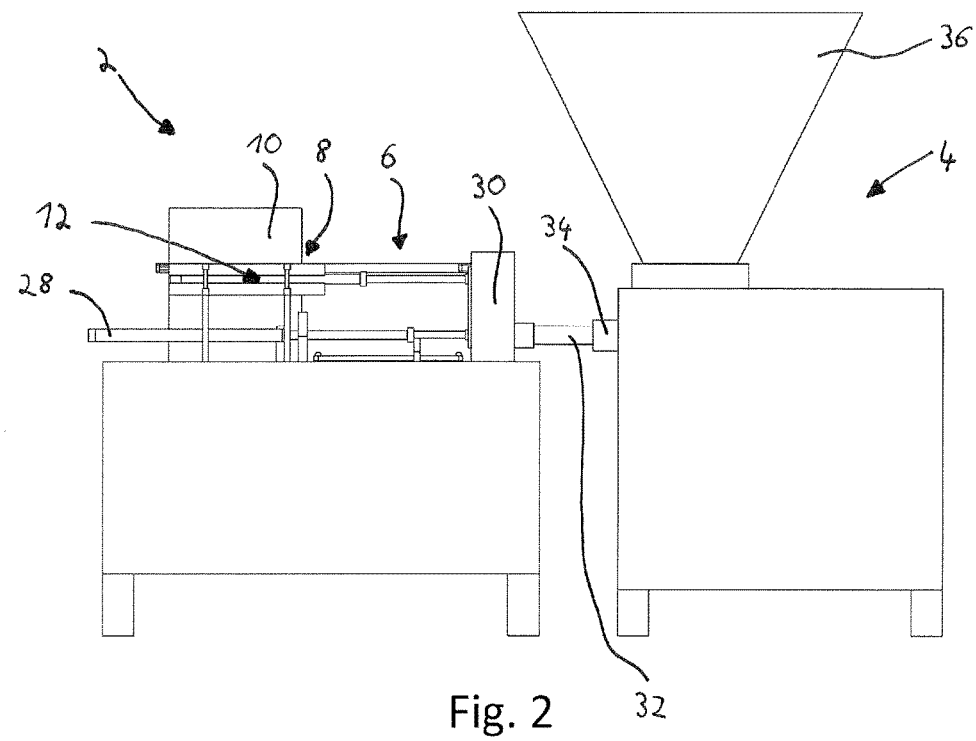
FIG. 2 shows a side view of the filling machine and the filling apparatus of FIG. 1.
Figure 3:
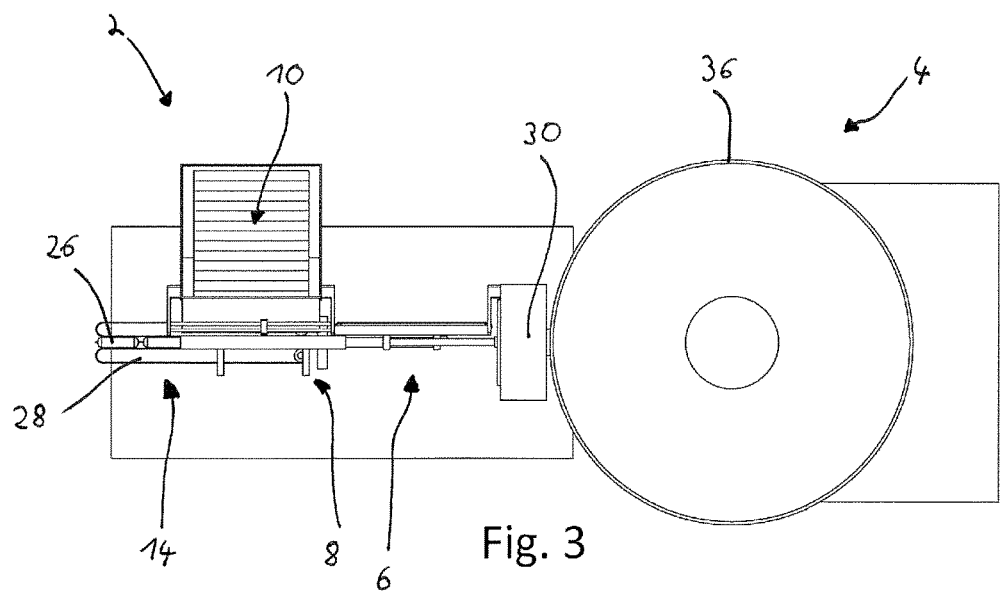
FIG. 3 shows a plan view of the filling machine and the filling apparatus of FIG. 1.
Figure 4:
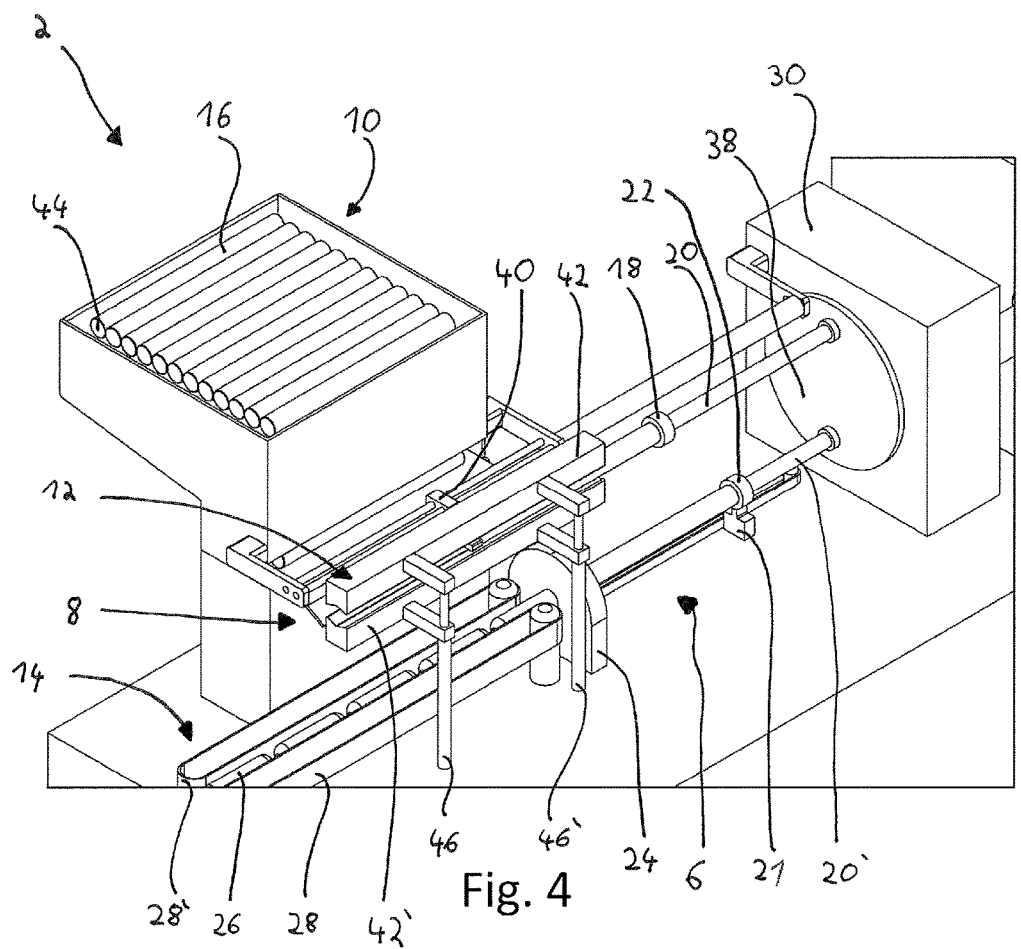
FIG. 4 shows a perspective view of an enlarged portion of the filling apparatus of FIG. 1 and a case loading unit arranged there for tubular cases.

FIGS. 2 and 3 show a side view and a plan view respectively of the filling apparatus of FIG. 1. FIG. 4 shows the case gripping device 12 in greater detail. The case gripping device 12 has two gripper jaws 42, 42' pivotably connected by way of gripper linkages 46, 46'. The case gripping device 12 makes it possible to take individual cases 16 from the case magazine 10, stop the cases 16 by displacement of the gripper jaws 42, 42' by the gripper linkages 46, 46' relative to each other and orientation of the case 16 axially relative to the filling tube 20. After orientation of the case 16 axially relative to the filling tube 20 the gripper jaws 42, 42' are opened slightly so that the pushing-on device 40 can push the case on to the filling tube 20 in the axial direction. The entrainment ring 18 is also advanced by virtue of the case 16 being pushed on to the filling tube 20.

A sensing device 49 with sensors is associated with the entrainment ring 18 and/or the pushing-on device 40, which makes it possible to determine the position thereof and further parameters like for example the translation speed thereof. The sensing device 49 has a control device 52 and at least one travel pick-up sensor and/or linear sensor for ascertaining the position of the entrainment ring (22) and/or the pushing-on device 40. The filling tube 20' is in the filling position, but it will be noted that no case 16 is fitted thereon in FIG. 4. An entrainment ring 22 is arranged on the filling tube 20'. That entrainment ring 22 is displaceable in the axial direction by the casing slider 21. In operation it is thus possible for the case 16 to be further displaced during the filling thereof in the direction of the casing braking system 24. Such further displacement is required as the gathered tubular case 16 is un-gathered and processed during the filling operation. The casing braking system 24 is supported moveably in the axial direction, like the entrainment ring 22. That is required in particular when the cases 16 have plugs 44. The plugs 44 prevent a case 16 from being pushed completely on to a filling tube 20, 20'. The length of those plugs 44 also varies. To permit processing of different plug lengths it is therefore necessary for the casing braking system 24 to be mounted moveably in the axial direction with respect to the filling tubes 20, 20'. Both the entrainment ring 22 and also the casing braking system 24 can be displaced by actuators (not shown) in respect of their axial position.

Figure 5:
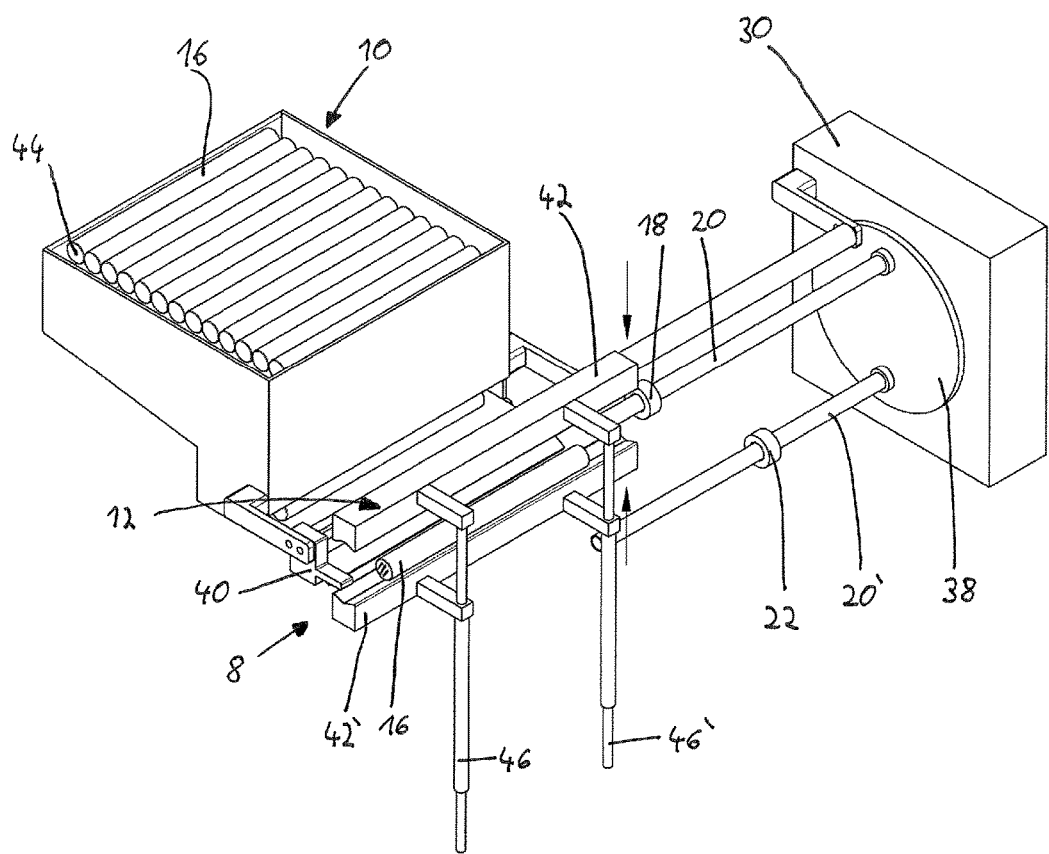
FIG. 5 shows a perspective view of portions of the filling apparatus of FIG. 1 during a step in a method of filling per one embodiment of the invention.
Figure 6:
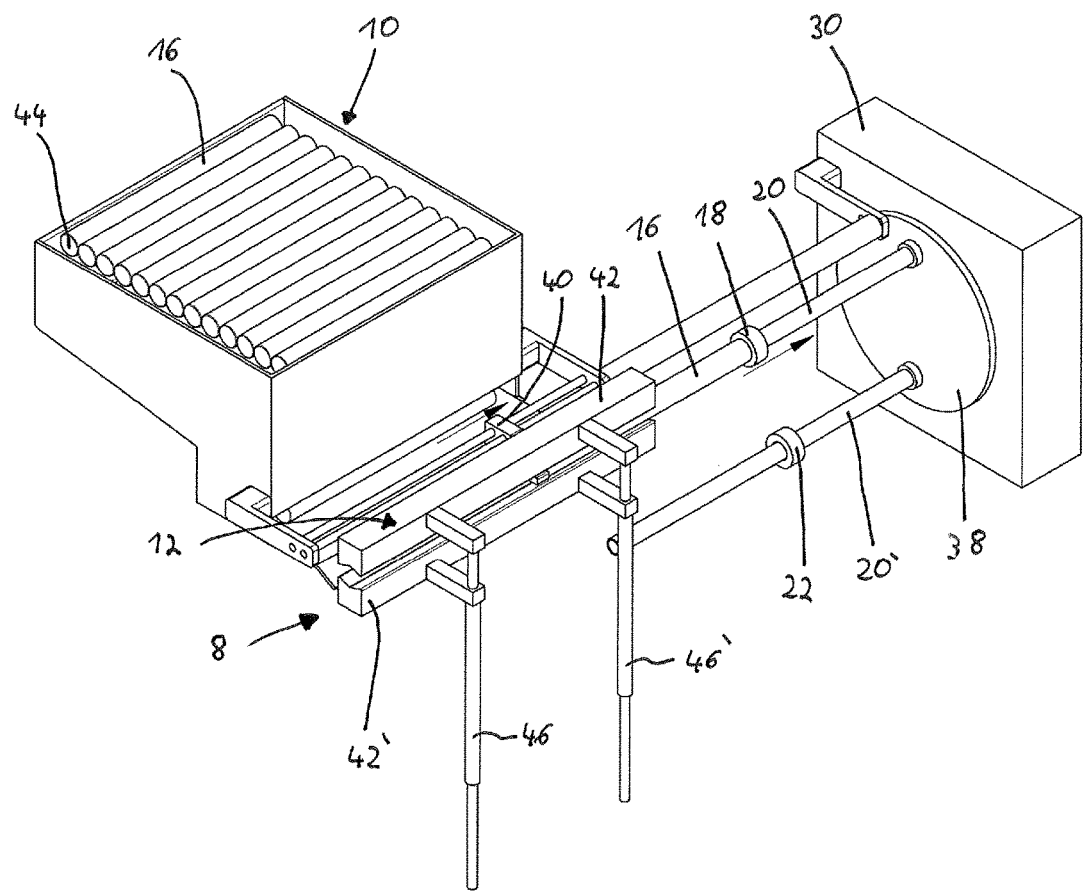
FIG. 6 shows a perspective view of portions of the filling apparatus of FIG. 1 in a successive method step after that shown in FIG. 5.

FIGS. 5 and 6 show the filling apparatuses during the sequence of successive method steps. In FIG. 5 firstly a case 16 passes out of the case magazine 10 on to the lower gripper jaw 42'. The gripper jaws 42 and 42' are in an opened state. In addition, the entrainment ring 18 is in a position near the open end of the filling tube 20. In FIG. 6 the gripper jaws 42, 42' are now so oriented that they orient the case 16 axially in relation to the filling tube 20. For that purpose, the gripper jaws 42, 42' are moved into the relevant position by the gripper linkages 46, 46'. The case 16 is admittedly positioned by the gripper jaws 42, 42' but it is held so loosely that the pushing-on device 40 can push the case 16 axially on to the filling tube. In that case the case 16 pushes the entrainment ring 18 in the direction of the receiving portion 38 on to the filling tube 20. After the case 16 has been pushed on to the filling tube 20 the receiving portion 38 can now be rotated through 180°, whereby the filling tube 20 moves into the filling position. In that situation the filling tube 20 can be freshly loaded with a case 16.

Figure 7:
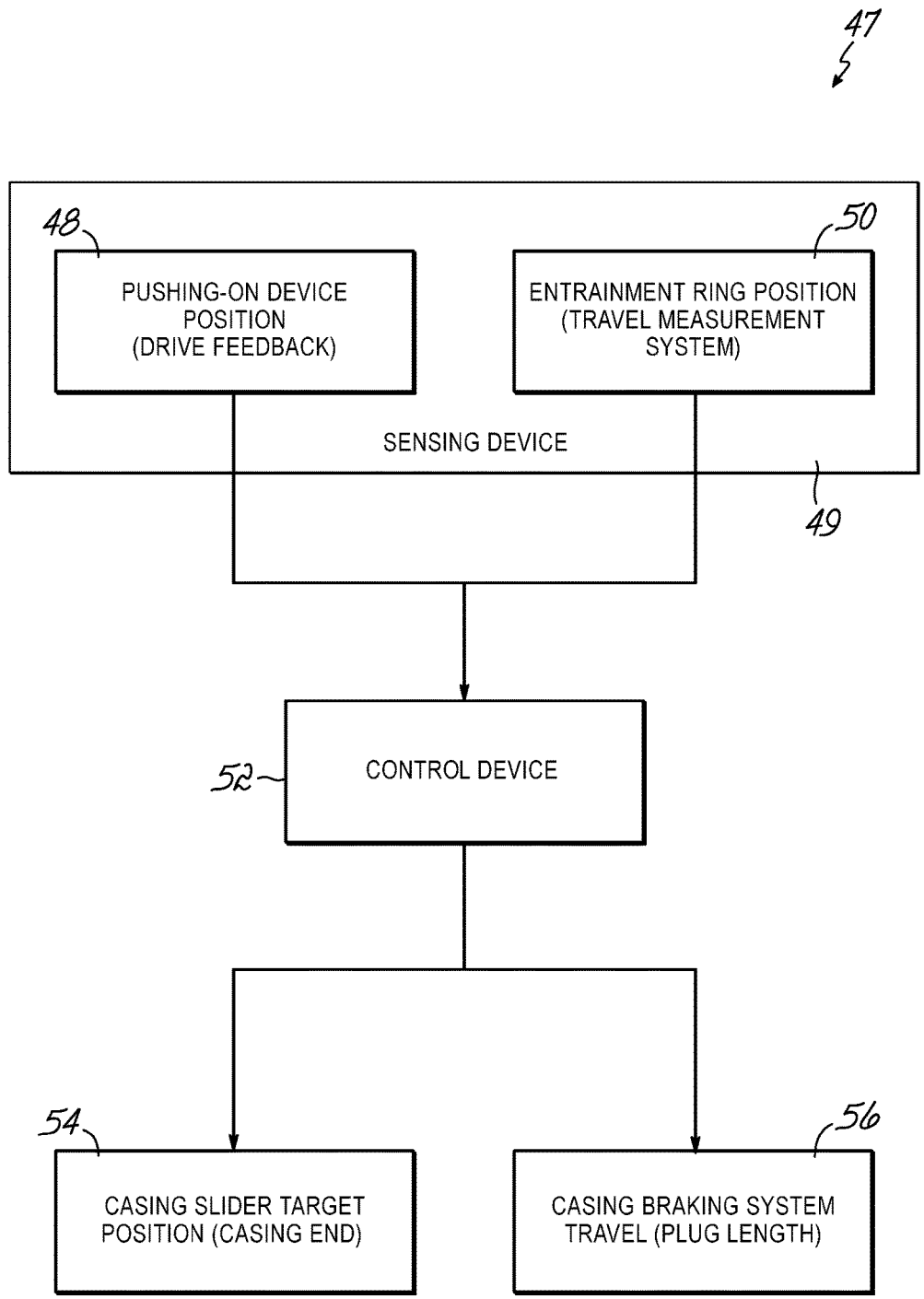
FIG. 7 shows a schematic block circuit diagram of the filling apparatus and method according to the invention.

FIG. 7 shows a block circuit diagram 47 showing processing of the sensed data "position pushing-on device" 48 and "position entrainment ring" 50 as an overview. The position of the pushing-on device 48 and the position of the entrainment ring 50 are ascertained by a sensing device 49, forming inputs for the control device 52. On the basis of the positions ascertained, the control device 52 ascertains on the one hand a target position 54 for the casing slider 21 which is adapted to the ascertained length of the cases 16 and a displacement travel 56 of the casing braking system 24 which is based on the ascertained length of the plugs 44.

Figure 8:
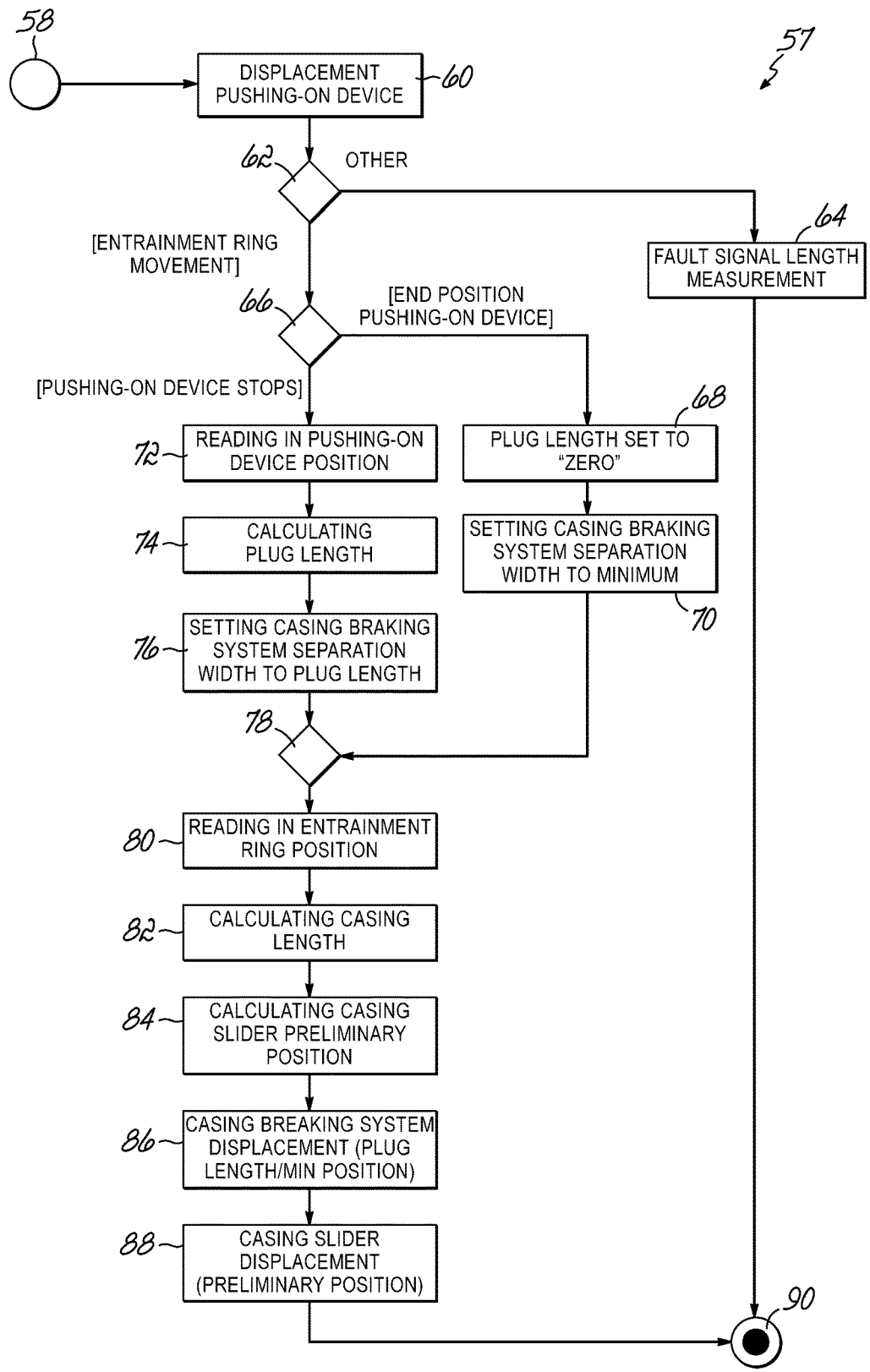
FIG. 8 shows a schematic flowchart outlining the method according to the invention.

The procedure in the method is shown in detail in the method flow chart 57 in FIG. 8. The method begins at the starting position 58. The case 16 is oriented axially relative to the filling tube 20 in that method step. That is now followed by method step 60 in which the pushing-on device 40 is moved to push the case 16 on to the filling tube 20. Method step 62 now involves detecting how far the entrainment ring 18 is moved by the case 16. If the entrainment ring 18 does not move in spite of the movement of the pushing-on device 40 then method step 64 involves generating a fault signal in respect of length measurement. The method finally reaches its end state 90.

If step 62 detects that the entrainment ring 18 moves, then in the subsequent step 66 a distinction is made as to the position in which the pushing-on device 40 stops. If the pushing-on device 40 stops in its end position in which the case 16 is pushed completely on to the filling tube 20 then in step 68 the plug length is set to zero. If consequently it is possible for the pushing-on device 40 to push the case 16 completely on to the filling tube 20 it is possible to conclude therefrom that the case 16 does not have a plug 44. After the plug length is set to zero in step 68 setting of the separation width of the casing braking system 24 is conducted in step 70.

If the pushing-on device 40 stops in method step 66 before reaching the end position however in step 72 the position of the pushing-on device 40 is read in. Taking account of the length of the filling tube 20 and the end position of the pushing-on device 40 the plug length is calculated in step 74. The plug length calculated in step 74 is then used in step 76 to adapt the positioning of the casing braking system 24 to the ascertained length of the plugs 44.

The method legs which are separated in step 66 are brought together in step 78. Step 80 involves reading in the position of the entrainment ring 22. With knowledge of the position of the entrainment ring 22 and the stop position or end position of the pushing-on device 40 it is now possible to calculate the length of the cases (sausage skin casings) 16 in step 82. In dependence on the length of the cases 16 a preliminary position for the casing slider 21 is calculated in step 84. The casing slider 21 can in that way be already roughly positioned so that time-consuming detection runs can be limited to a minimum. Finally, in step 86, a travel movement of the casing braking system 24 is conducted in dependence on the presence of a plug 44 or the detected plug length. Step 88 involves effecting a movement of the casing slider 21 towards the ascertained preliminary position. The method then reaches its end state 90.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES USED 2 attachment
4 machine
6 filling apparatus
8 case loading unit
10 case magazine
12 case gripping device
14 conveyor device 16 case
18 entrainment ring
20, 20' filling tube
21 casing slider
22 entrainment ring
24 casing braking system
26 sausage
28, 28' conveyor element
30 twisting-off head
32 discharge tube
34 extrusion head
36 filling hopper
38 receiving portion
40 pushing-on device
42, 42' gripper jaws
44 plug
46, 46' gripper linkages
47 block circuit diagram
48 sensor position pushing-on device
49 sensing device
50 sensor position entrainment ring
52 control device
54 target position casing slider
56 displacement travel casing braking system
57 method flow chart
58 start
60 displacement movement of the pushing-on device
62 branching: entrainment ring movement
64 fault signal length measurement
66 branching: end position pushing-on device
68 plug length set to "zero"
70 setting casing braking system separation width
72 reading in the pushing-on device position
74 calculating plug length
76 setting casing braking system separation width
78 bringing the method legs together
80 reading in the entrainment ring position
82 calculating the case length
84 calculating the casing slider preliminary position
86 casing braking system displacement movement
88 casing slider displacement movement
90 end state

What is claimed is:

1. A filling apparatus for filling gathered tubular cases with a pasty material such as sausage meat, comprising:
   a filling tube on to which a gathered tubular case can be pushed;
   a moveable receiving portion which accommodates a first end of the filling tube and which is adapted to move the filling tube into a charging position in which the case can be put on to the filling tube and into a filling position in which the case can be filled;
   a pushing-on device which is moveable axially relative to a filling tube longitudinal axis for pushing the case on to the filling tube in the charging position;
   an axially moveable entrainment ring arranged on the filling tube; and
   a sensing device for ascertaining a position of at least one of the entrainment ring and the pushing-on device.

2. The filling apparatus of claim 1, wherein the sensing device has at least one travel pick-up sensor and/or linear sensor for ascertaining the position of the entrainment ring and/or the pushing-on device.

3. The filling apparatus of claim 2, wherein the at least one travel pick-up sensor and/or linear sensor is defined by at least one of an inductive sensor and an optical sensor.

4. The filling apparatus of claim 1, wherein the position of the pushing-on device is ascertained by feedback from its drive element.

5. The filling apparatus of claim 1, wherein the sensing device has a control device adapted to determine a case length.

6. The filling apparatus of claim 5, wherein the filling apparatus has a casing slider adapted to move the entrainment ring in the filling position axially relative to the filling tube longitudinal axis, and a casing braking system, wherein an axial spacing between the casing braking system and the filling tube longitudinal axis is variable, and
   wherein the control device is adapted to control a position of the casing braking system and a position of the casing slider axially relative to the filling tube longitudinal axis.

7. The filling apparatus of claim 5, wherein the case has a plug, wherein the control device is adapted to determine a plug length.

8. The filling apparatus of claim 7, wherein the filling apparatus has a casing slider adapted to move the entrainment ring in the filling position axially relative to the filling tube longitudinal axis, and a casing braking system, wherein an axial spacing between the casing braking system and the filling tube longitudinal axis is variable, and
   wherein the control device is adapted to control a position of the casing braking system and a position of the casing slider axially relative to the filling tube longitudinal axis.

9. The filling apparatus of claim 1, wherein:
   the sensing device has at least one travel pick-up sensor and/or linear sensor for ascertaining the position of the entrainment ring and/or the pushing-on device;
   the at least one travel pick-up sensor and/or linear sensor is defined by at least one of an inductive sensor and an optical sensor;
   the position of the pushing-on device is ascertained by feedback from its drive element;
   the sensing device has a control device adapted to determine a case length;
   the case has a plug, wherein the control device is adapted to determine a plug length;
   the filling apparatus has a casing slider adapted to move the entrainment ring in the filling position axially relative to the filling tube longitudinal axis, and a casing braking system, wherein an axial spacing between the casing braking system and the filling tube longitudinal axis is variable; and
   the control device is adapted to control a position of the casing braking system and a position of the casing slider axially relative to the filling tube longitudinal axis.

10. A method of filling gathered tubular cases with a pasty material by using a filling apparatus, the method comprising:
    providing a filling apparatus in accordance with claim 1;
    providing a gathered tubular case;
    pushing the case on to a filling tube by the pushing-on device; and
    ascertaining a position of at least one of the pushing-on device and the entrainment ring arranged on the filling tube.

11. The method of claim 10, further comprising:
    determining a case length from the position of the entrainment ring and/or the pushing-on device.

12. The method of claim 11, further comprising:
determining a length of a plug arranged at the case from the position of the pushing-on device after the case has been completely pushed on to the filling tube.

13. The method of claim 12, further comprising:
stopping the filling apparatus when one of the following occurs:
exceeding of a definable maximum plug length is detected,
when the case cannot be pushed completely on to the filling tube, and
when the case buckles while being pushed on.

14. The method of claim 13, further comprising:
controlling the position of a casing braking system moveable axially relative to the filling tube longitudinal axis in such a way that the spacing of the casing braking system from an open end of the filling tube, that faces towards the casing braking system, is greater in the filling position than the detected plug length.

15. The method of claim 14, further comprising:
controlling the position of a casing slider which is moveable axially relative to the filling tube longitudinal axis in such a way that the position of the casing slider corresponds to the case length.

* * * * *